(12) United States Patent  
Ikeno et al.

(10) Patent No.: US 10,101,452 B2  
(45) Date of Patent: Oct. 16, 2018

(54) DISTANCE MEASURING DEVICE

(71) Applicant: STANLEY ELECTRIC CO., LTD., Meguro-ku, Tokyo (JP)

(72) Inventors: Ryohei Ikeno, Tokyo (JP); Hiroshige Goto, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 78 days.

(21) Appl. No.: 15/434,550

(22) Filed: Feb. 16, 2017

(65) Prior Publication Data

US 2017/0276789 A1　Sep. 28, 2017

(30) Foreign Application Priority Data

Mar. 24, 2016　(JP) ................. 2016-060249

(51) Int. Cl.
*G01S 17/08* (2006.01)
*H04N 5/343* (2011.01)
*H04N 5/378* (2011.01)
*H04N 5/347* (2011.01)

(52) U.S. Cl.
CPC ............ *G01S 17/08* (2013.01); *H04N 5/343* (2013.01); *H04N 5/347* (2013.01); *H04N 5/378* (2013.01)

(58) Field of Classification Search
CPC ........ G01S 17/08; H04N 5/343; H04N 5/347; H04N 5/378
See application file for complete search history.

(56) References Cited

U.S. PATENT DOCUMENTS

| 7,683,954 | B2 | 3/2010 | Ichikawa et al. |
| 8,704,926 | B2 | 4/2014 | Schemmann et al. |
| 8,759,736 | B2 | 6/2014 | Yoo |
| 2015/0350575 | A1 | 12/2015 | Agranov et al. |

FOREIGN PATENT DOCUMENTS

| JP | 2008089346 A | 4/2008 |
| JP | 2011530920 A | 12/2011 |
| JP | 2012019516 A | 1/2012 |
| JP | 2015228650 A | 12/2015 |

*Primary Examiner* — Huy T Nguyen
(74) *Attorney, Agent, or Firm* — Holtz, Holtz & Volek PC

(57) ABSTRACT

In a distance measuring device, a pixel G includes sub pixels Po and Pe in a row direction. Floating diffusion parts Fd1 to Fd4 detect charge quantities relating to reflected modulated light Lb in four terms which are delayed in start by every ¼ of a period of emitted modulated light La in order. A binning group Gv is configured by an array part that the two sub pixels Po and the two sub pixels Pe are adjacent to each other in a row direction.

3 Claims, 7 Drawing Sheets

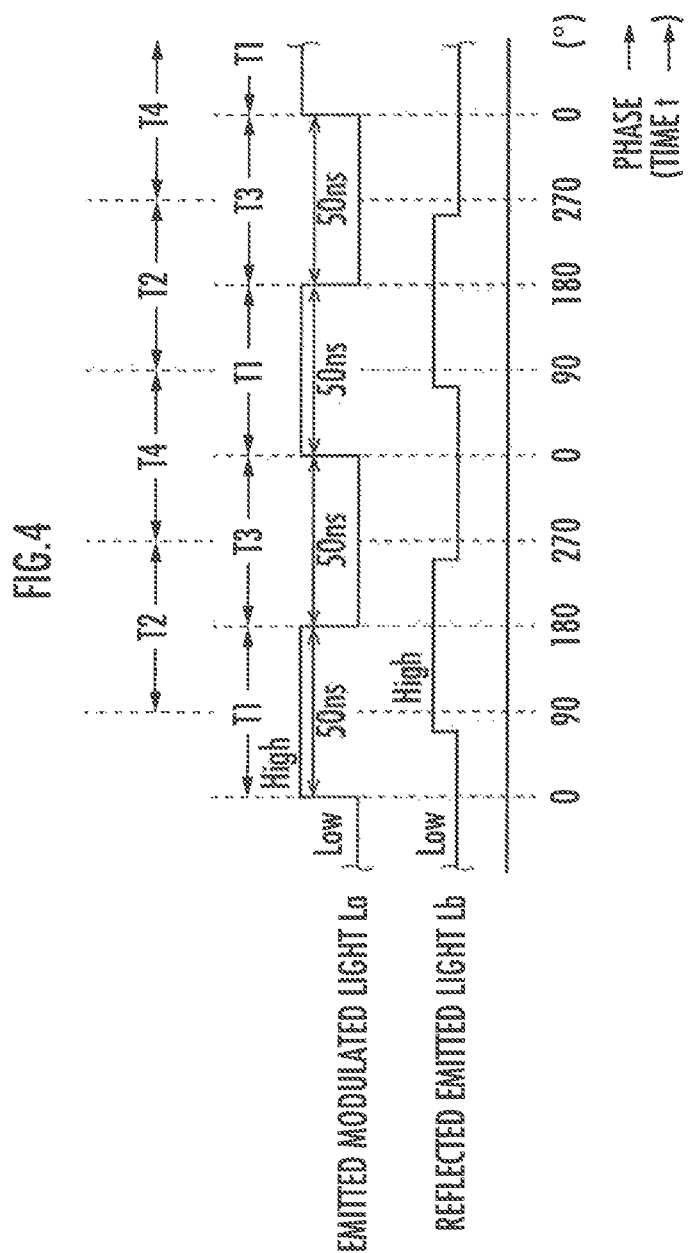

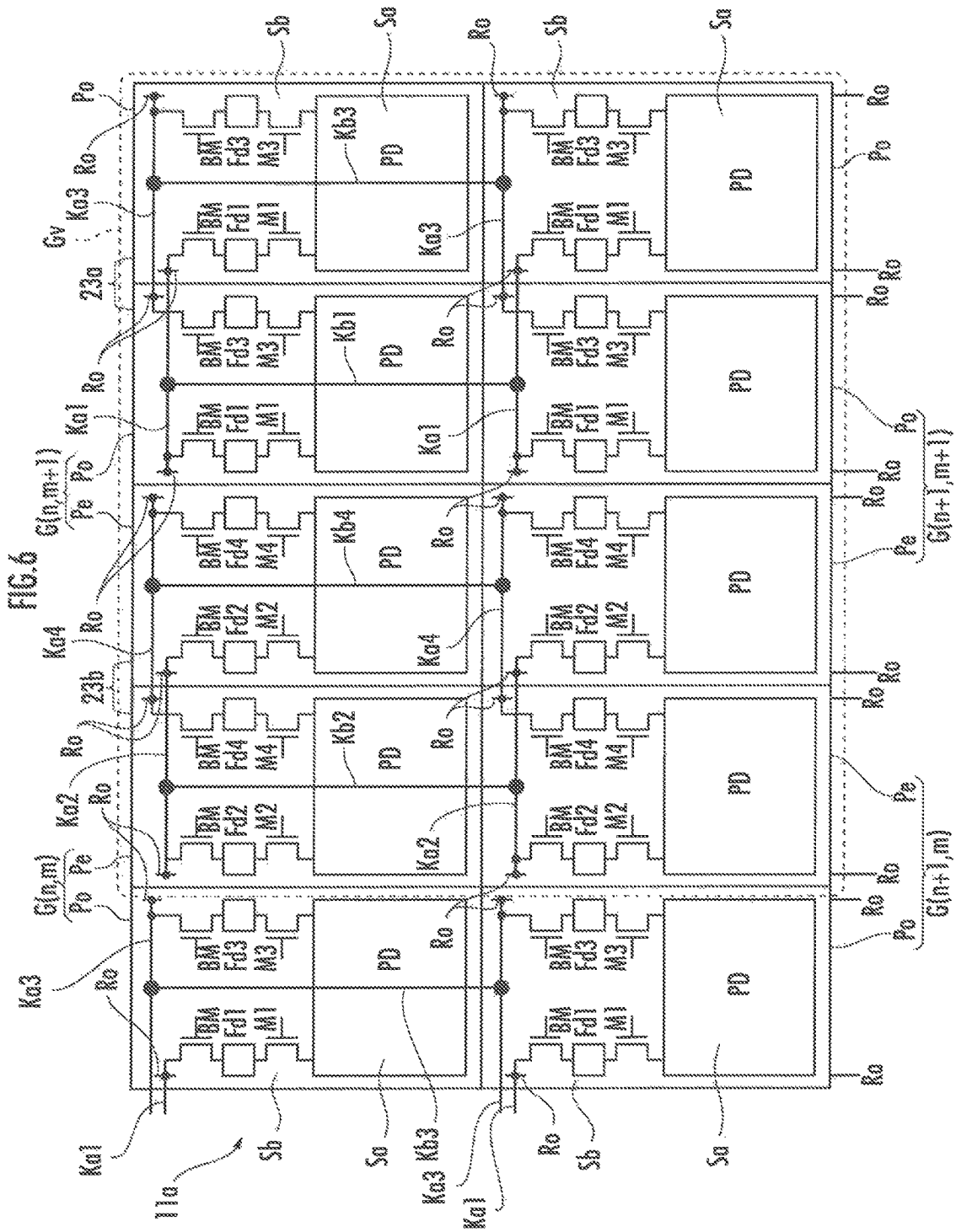

DISTANCE MEASURING DEVICE

TECHNICAL FIELD

The present invention relates to a distance measuring device which performs distance measurement by a TOF (Time Of Flight) system.

BACKGROUND OF THE INVENTION

The distance measuring device which performs distance measurement by the TOF system is known (for example, Japanese Patent Application Laid-Open No. 2008-89346).

In a general structure, such a distance measuring device as described above includes, for example, an imaging element which includes a plurality of pixels of a grid array and makes a stored charge quantity of charges which have been generated in relation to an intensity of incident light readable from the outside in units of pixels, a modulated light emission unit which emits modulated light the intensity of which has been modulated toward an imaging range of the imaging element, a phase difference detection unit which detects a phase difference between emitted modulated light that the modulated light emission unit has emitted and reflected modulated light which has been obtained as a result of incidence of the emitted modulated light which has been reflected from an object for distance measurement within the imaging range upon the pixels of the imaging element on the basis of the stored charge quantity which has been read out of the imaging element in units of the pixels, and a distance measuring unit which measures a distance from the distance measuring device to the object for distance measurement on the basis of the phase difference that the phase difference detection unit has detected.

The phase difference detection unit acquires four pieces of phase information on phases which deviate from one another by every ¼ (90 degrees in phase) of a period of emitted light and derives a phase difference (a phase delay) from, for example, an arctangent formula.

A general imaging element for TOF includes two charge storage parts for one photodiode and acquires phase information on phases which deviate from each other by 180 degrees from the two charge storage parts. Accordingly, in order to simultaneously acquire four pieces of phase information on phases which deviate from one another by 90 degrees, one pixel is configured by two sub pixels (the number of the photodiodes is two) so as to have four charge storage parts in total.

In a related art imaging element to be mounted on the distance measuring device, a first sub pixel and a second sub pixel which detect stored charge quantities in two different storage terms are alternately arrayed one by one in a row direction of the grid array.

On the other hand, there is such a usage status that it is sufficient even when an image dissolution (a minimum size of a distance measurement object distance measurement of which is possible) of the imaging element is low and the imaging element is configured so as to cope with a binning read-out mode. Incidentally, since in the binning read-out mode, the total number of pixels to be processed substantially is reduced, there are such advantages that a required time taken for performing measurement processing is reduced, incident light intensities are averaged and the influence of noise is suppressed.

In Japanese Patent Application Laid-Open No. 2011-530920, Japanese Patent Application Laid-Open No. 2012-19516 or Japanese Patent Application Laid-Open No. 2015-228650, there is disclosed an imaging element which, though not the imaging element to be mounted on the distance measuring device, is mounted on a video filming camera and includes a connection wire for binning. Unlike the imaging element used for distance measurement by the TOF system, in the imaging element for the video filming camera, detection of the stored charge quantities in each of a plurality of terms which are different from one another in start is not requested.

Accordingly, in the imaging element for the video filming camera, each sub pixel has only one charge storage part. In addition, the connection wire for binning is simply wired between the adjacent sub pixels (Japanese Patent Application Laid-Open No. 2011-530920) or is wired between the charge storage parts of each sub pixel for the same color. In addition, in an imaging element for a video filming color camera which is disclosed in Japanese Patent Application Laid-Open No. 2012-19516 or Japanese Patent Application Laid-Open No. 2015-228650, the mutually corresponding sub pixels of the same kind, that is, the sub pixels which detect the light intensity of the same color component of incident light are not continuously arrayed in the row direction or in the column direction of the grid array.

It is desired to connect together the mutual first sub pixels with each other and to connect together the mutual second sub pixels in order to cope with binning. However, in the related art imaging element, in the case where the sub pixels to be objects for wire connection have been connected together, since a sub pixel which is not the object for wire connection is interposed between the sub pixels concerned, the length of the connection wire is increased. An increase in length of the connection wire causes a reduction in aperture ratio.

SUMMARY OF THE INVENTION

The present invention has been made in view of the above mentioned circumstance and aims to provide a distance measuring device making it possible to reduce the length of the connection wire used for coping with binning.

According to one embodiment of the present invention, there is provided a distance measuring device which includes an imaging element which includes a plurality of pixels of a grid array and makes a stored charge quantity of charges which have been generated in relation to an intensity of incident light readable from the outside in units of pixels, a modulated light emission unit which emits modulated light the intensity of which has been modulated toward an imaging range of the imaging element, a phase difference detection unit which detects a phase difference between emitted modulated light that the modulated light emission unit has emitted and reflected modulated light which has been obtained as a result of incidence of the emitted modulated light which has been reflected from an object for distance measurement within the imaging range upon the pixels of the imaging element on the basis of the stored charge quantity which has been read out of the imaging element in units of the pixels, and a distance measuring unit which measures a distance from the distance measuring device to the object for distance measurement on the basis of the phase difference that the phase difference detection unit has detected, Each pixel includes a first sub pixel and a second sub pixel which have been arrayed adjacently to each other in a row direction. A first term, a second term, a third term and a fourth term which have equal lengths which are less than one period of the emitted modulated light and are delayed in start by every ¼ of the period of the emitted modulated light in order are set. The first sub pixel includes a first charge generation part which generates the charges of the charge quantity which is related to the intensity of incident light, a first charge storage part which stores the charges that the first charge generation part has generated in the first term, and a third charge storage part which stores the charges that the first charge generation part has generated in the third term. The second sub pixel includes a second charge generation part which generates the charges of the charge quantity which is related to the intensity of incident light, a second charge storage part which stores the charges that the second charge generation part has generated in the second term, and a fourth charge storage part which stores the charges that the second charge generation part has generated in the fourth term. The phase difference detection unit reads the stored charge quantity of the first charge storage part, the stored charge quantity of the second charge storage part, the stored charge quantity of the third charge storage part and the stored charge quantity of the fourth charge storage part as the stored charge quantities out of the imaging element and detects the phase difference on the basis of the read-out stored charge quantities. A first row part that the two first sub pixels are continuously arrayed in the row direction and a second row part that the two second sub pixels are continuously arrayed in the row direction are alternately arrayed in the row direction in each row of the grid array. In the adjacent first sub pixels in each first row part, the mutual first charge storage parts are connected together by a first connection wire which allows switching between a connected state and an unconnected state, and the mutual third charge storage parts are connected together by a third connection wire which allows switching between the connected state and the unconnected state. In the adjacent second sub pixels in the second row part, the mutual second charge storage parts are connected together by a second connection wire which allows switching between the connected state and the unconnected state, and the mutual fourth charge storage parts are connected together by a fourth connection wire which allows switching between the connected state and the unconnected state.

According to one embodiment of the present invention, the first row part and the second row part are alternately arrayed in the row direction. Consequently, since each connection wire is wired between the sub pixels which are adjacent to each other in the row direction without passing through the sub pixel in which there exists no object for wire connection, it is possible to reduce the length of the connection wire for binning.

Preferably, the grid array includes a column of only the first sub pixels and a column of only the second sub pixels, an assembly of the sub pixels in which two groups in each of which one first row part and one second row part are adjacent to each other in the row direction are continuously arranged in a column direction is set as one sub pixel group, and in each sub pixel group, the mutual first connection wires are connected together by a fifth connection wire which allows switching between the connected state and the unconnected state, the mutual second connection wires are connected together by a sixth connection wire which allows switching between the connected state and the unconnected state, the mutual third connection wires are connected together by a seventh connection wire which allows switching between the connected state and the unconnected state, and the mutual fourth connection wires are connected together by an eighth connection wire which allows switching between the connected state and the unconnected state.

According to the above-mentioned configuration, each of the fifth to eighth connection wires which serve as the connection wires for coping with binning in the column direction is wired between the sub pixels which are adjacent to each other in the column direction without passing through the sub pixel in which there exists no object for wire connection. Consequently, it is possible to reduce the lengths of the fifth to eighth connection wires.

Preferably, each sub pixel is partitioned into a first region in which the first charge generation part or the second charge generation part is arranged and a second region in which either the first charge storage part and the third charge storage part or the second charge storage part and the fourth charge storage part are arranged in the column direction, and in each sub pixel group, the mutually corresponding sub pixels which are adjacent to each other in the column direction are arranged with the mutual second regions thereof being adjacent to each other in the column direction.

According to the above-mentioned configuration, in each sub pixel group, the mutual sub pixels which are adjacent to each other in the column direction are arranged with the mutual second regions thereof being arranged adjacent to each other in the column direction. Thereby, each of the fifth to eighth connection wires is wired between the second regions which are adjacent to each other in the column direction without passing through the first region. Consequently, it is possible to reduce the lengths of the fifth to eighth connection wires.

BRIEF DESCRIPTION OF THE DRAWINGS

FIG. 4 is a timing chart illustrating one example of emitted modulated light and reflected modulated light;

FIG. 6 is a diagram illustrating one example of a connection wire for binning in the pixel array part in FIG. 5B.

DESCRIPTION OF THE PREFERRED EMBODIMENTS

Figure 1:
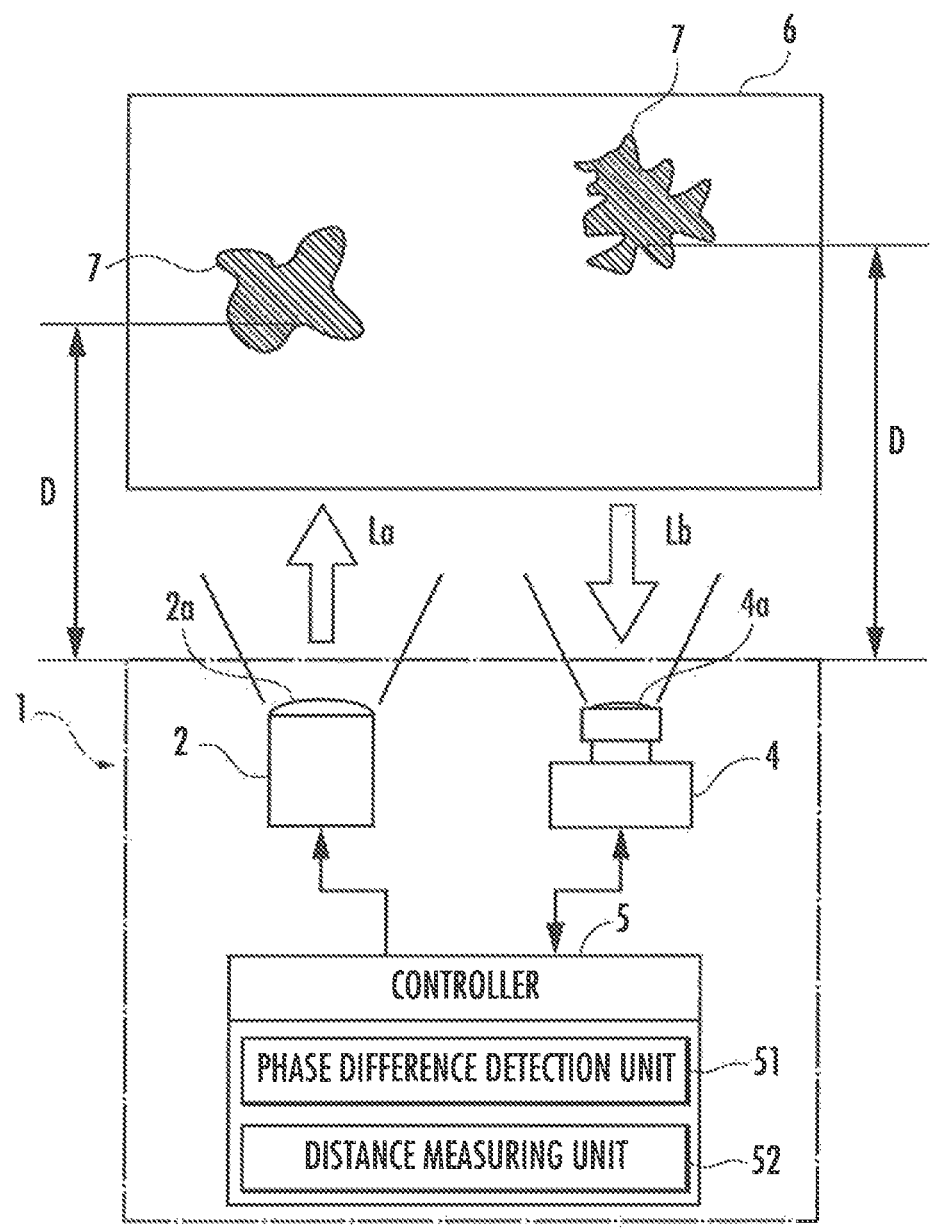
FIG. 1 is a diagram illustrating one example of an overall configuration of a distance measuring device according to one embodiment of the present invention.

FIG. 1 is a diagram illustrating one example of an overall configuration of a distance measuring device 1 according to one embodiment of the present invention. The distance measuring device 1 includes a modulated light emission unit 2, a camera 4, a controller 5 and so forth and measures a distance D from the distance measuring device 1 to an object for distance measurement 7 which is present in an imaging range 6 of the camera 4.

The modulated light emission unit 2 is controlled to be put on and off with a control signal from the controller 5, blinks on and off, for example, at 10 MHz (FIG. 4) and generates modulated light the intensity of which has been modulated. The modulated light is distributed and adjusted by a lens 2a which has been mounted on a light emission part of the modulated light emission unit 2 and is emitted as emitted modulated light La. Thereby, the emitted modulated light La radiates the entire of the imaging range 6 at one time.

When the object for distance measurement 7 is present within the imaging range 6, the emitted modulated light La is reflected from the object for distance measurement 7 and returns to the distance measuring device 1 as reflected modulated light Lb which is derived from the emitted modulated light La after reflected. A lens 4a is mounted on an incidence part of the camera 4, collects light which is incident upon the incidence part from the imaging range 6 and makes the light incident upon an imaging element 10 (FIG. 2) in the camera 4 as captured image light. Background light and the reflected modulated light Lb are included in the captured image light. The reflected modulated light Lb is incident upon a corresponding pixel G (FIG. 2) in the imaging element 10 in accordance with a position that the object for distance measurement 7 from which the reflected modulated light Lb is derived occupies in the imaging range 6.

The modulated light emission unit 2 is one example of a modulated light emission unit which emits the modulated light the intensity of which has been modulated toward the imaging range of the imaging element. The controller 5 includes a phase difference detection unit 51 and a distance measuring unit 52.

Details of processing that the distance measuring device 1 measures the distance D by the TOF system will be described later and therefore the distance measuring device 1 will be briefly described here. The imaging element 10 (FIG. 2) of the camera 4 makes a stored charge quantity of charges which have been generated in relation to the intensity of incident light for every pixel readable from the outside. The phase difference detection unit 51 detects a phase difference φ between the emitted modulated light La that the modulated light emission unit 2 has emitted and the reflected modulated light Lb on the basis of the stored charge quantity which has been read out of the imaging element 10 for every pixel. The distance measuring unit 52 measures the distance D on the basis of the phase difference that the phase difference detection unit 51 has detected.

Figure 2:
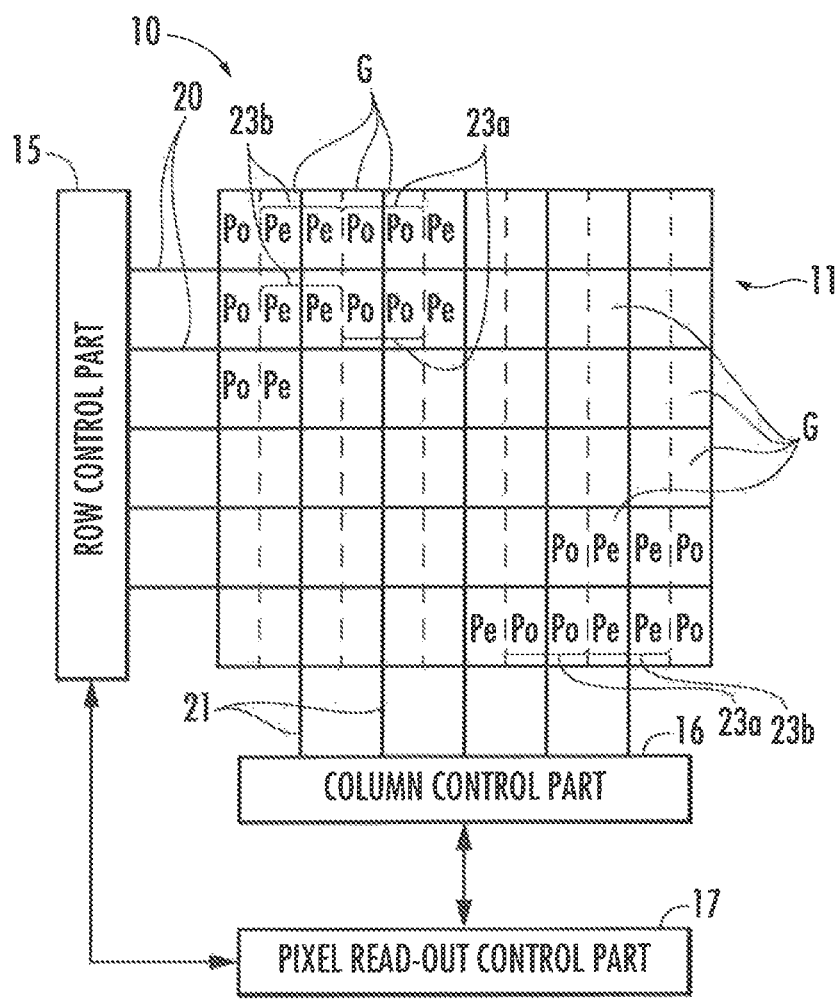
FIG. 2 is a diagram illustrating one example of a configuration of an imaging element that a camera includes.

FIG. 2 is a diagram illustrating one example of a configuration of the imaging element 10 that the camera 4 includes. The imaging element 10 includes a pixel array part 11, a row control part 15, a column control part 16, a pixel read-out control part 17 and so forth as main constitutional elements. Incidentally, the imaging element 10 is a CMOS type element.

The pixel array part 11 in FIG. 2 is illustrated in a state of being viewed from the front and includes a plurality of pixels G(n, m) which have been distributed on a plane in a grid array that the pixels are lined up in the column direction (the longitudinal direction) and in the row direction (the transverse direction).

Incidentally, in order to specify each pixel G in the pixel array part 11, each pixel is expressed as the pixel G(n, m) (see FIG. 6 and so forth) by using the row number n and the column number m. It is supposed that the pixel G(n, m) indicates the pixel G which is present in the n-th row counted from the top and in the m-th column counted from the left, viewing the pixel array part 11 from the front. Incidentally, the pixel array part 11 is configured by, for example, 126 (the number of rows)×126 (the number of columns) pixels G. Hereinafter, when specific distinction of individual pixels is not requested, the pixel G(n, m) will be generally called the pixel G.

Each pixel G includes two sub pixels, that is, a sub pixel Po and a sub pixel Pe. When the sub pixel Po and the sub pixel Pe are not distinguished from each other, the sub pixel will be generally called the "sub pixel P"

In the grid array of the pixel array part 11, a row part that the two sub pixels Po are continuously arrayed in the row direction is called a first row part 23a and a row part that the two sub pixels Pe are continuously arrayed in the row direction is called a second row part 23b. The first row part 23a and the second row part 23b are alternately arrayed in the row direction in each row.

In addition, each column is configured only by the sub pixels Po or only by the sub pixels Pe. That is, the sub pixels Po and the sub pixels Pe are not present in the same column in a mixed state. Accordingly, the first row parts 23a are arrayed continuously in the column direction in an aligned state and also the second row parts 23b are arrayed continuously in the column direction in the aligned state.

The row control part 15 is configured to supply a control signal to a row control line 20 so as to allow row-by-row control of the pixels G of the pixel array part 11. The column control part 16 is configured to supply a control signal to a column control line 21 so as to allow column-by-column control of the pixels G of the pixel array part 11. The pixel read-out control part 17 controls the row control part 15 and the column control part 16 on the basis of a control signal from the controller 5 (FIG. 1).

Figure 3:
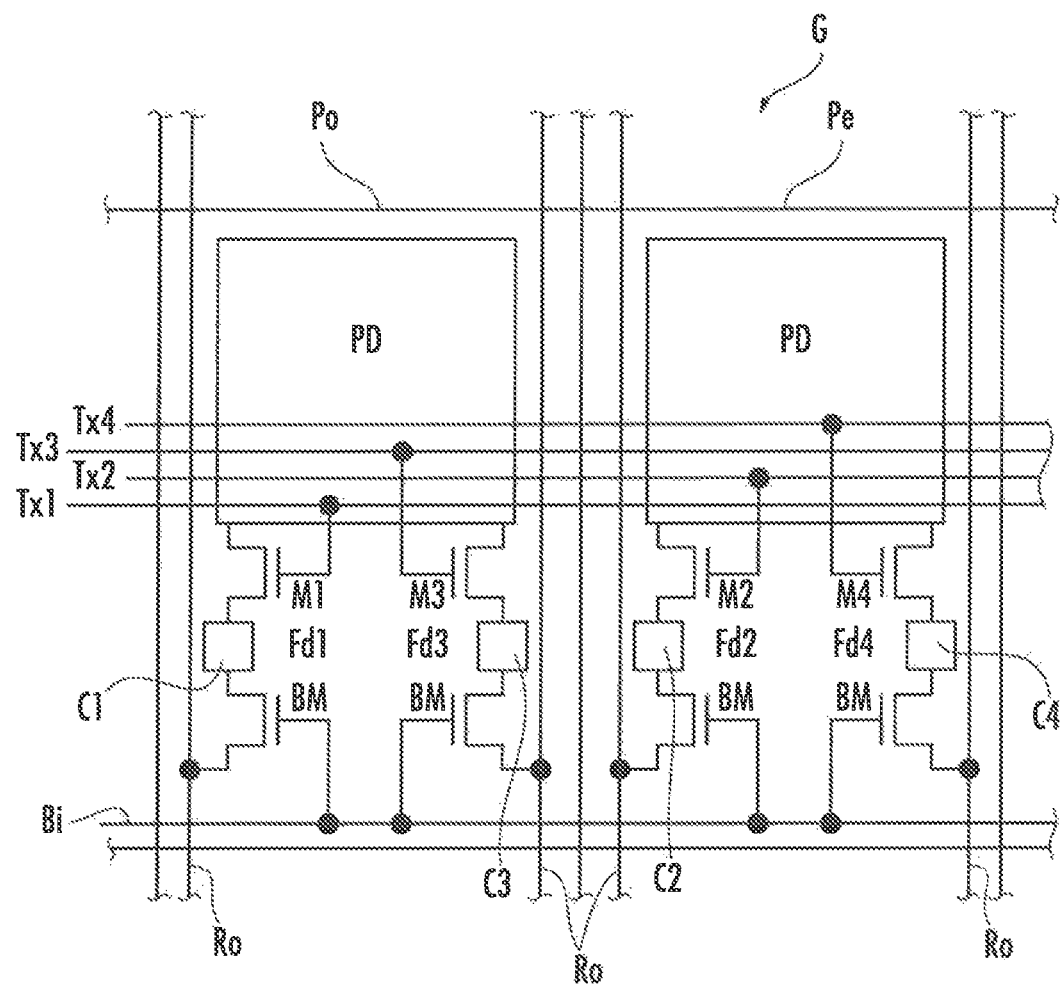
FIG. 3 is a diagram illustrating one example of a detailed configuration of a pixel.

FIG. 3 is a diagram illustrating one example of a configuration of the pixel G. The pixel G illustrated in FIG. 3 is a pixel that an odd number is assigned as the column number (m in G(n, m)) and the sub pixel Po is arranged on the left side and the sub pixel Pe is arranged on the right side. In the pixel G that an even number is assigned as the column number (m in G(n, m)), the sub pixel Pe is arranged on the left side and the sub pixel Po is arranged on the right side. In FIG. 3, illustration of a connection wire for binning such as a later described connection wire K1 and so forth is omitted.

The sub pixel Po includes PD, M1, M3, Fd1, Fd3 and two BM. The sub pixel Pe includes PD, M2, M4, Fd2, Fd4 and two BM. Incidentally, it is supposed that PD means a photodiode, M means a distribution switch, Fd means a floating diffusion part as a charge storage part, and BM means a transfer switch. The switches M1 to M4 and BM are configured by FFTs (Field Effect Transistors). Incidentally, when individual distinction of the floating diffusion parts Fd1 to Fd4 is not requested, the floating diffusion part will be generally called "Fd".

Control signals which control on/off operations of the switches M1 to M4 are supplied from the row control part 15 to lines Tx1 to Tx4. A control signal which controls the on/off operation of the switch BM is supplied from the row control part 15 to a line Bi. The lines Tx1 to Tx4 and Bi are altogether illustrated as one row control line 20 in FIG. 2.

Lines Ro are connected to drains of all of the switches BM in the columns of the floating diffusion parts Fd (four columns of the floating diffusion parts Fd1 to Fd4 are defined in total for one column of the pixels G of the grid array as the columns of the floating diffusion parts Fd) in the grid array of the pixel array part 11. The column control part 16 individually reads C1 to C4 which are read-out values of the charge quantities of charges which are stored in the floating diffusion parts Fd1 to Fd4 of each pixel G via the lines Ro for every pixel G. One column control line 21 illustrated in FIG. 2 includes at least the line Ro.

The sub pixel Po and the sub pixel Pe are the same as each other in overall operation excepting that operation timings of gates (that is, the switches M1 to M4 and BM) which are respectively mounted on the sub pixels Po and Pe are different from each other. Accordingly, only the operation of the sub pixel Po will be described.

The larger the intensity of incident light which is incident upon the pixel G is, the larger number of electrons the photodiode PD generates. Incidentally, the charge quantity (an absolute value) is increased with increasing the number of the electrons. The switches M1 and M3 are turned on and off out of phase with each other by application of voltages through the lines Tx1 and Tx3. That is, one on-operation and one off-operation are set as one on/off cycle, in each on-off cycle, the switch M3 is set in an off-term when the switch M1 is in an on-term and the switch M3 is set in the on-term when the switch M1 is in the off-term. In each on-off cycle, the length of the on-term of the switch M1 is equal to the length of the on-term of the switch M3. Incidentally, the period of the on-off cycle is set to the period of the emitted modulated light La and the on-term is set to a half period of the emitted modulated light La.

In the on-term of the switch M1, the electrons that the photodiode PD has generated are supplied to and stored into the floating diffusion part Fd1. In the on-term of the switch M3, the electrons that the photodiode PD has generated are supplied to and stored into the floating diffusion part Fd3. In the plurality of on-off cycles of the switches M1 and M3, the charges of the charge quantities related to the intensity of the light which has been incident upon the pixel G (in a strict sense, the sub pixel Po) are stored into the floating diffusion parts Fd1 and Fd3. The column control part 16 brings the line Ro into a conductive state at a predetermined read-out timing, reads the charge quantities out of the floating diffusion parts Fd1 and Fd3 via the lines Ro as the read-out values C1 and C3 and outputs the values C1 and C3 so read-out to the pixel read-out control part 17. The values C1 and C3 are further sent from the pixel read-out control part 17 to the controller 5 (FIG. 1).

FIG. 4 is a timing chart illustrating one example of the emitted modulated light La and the reflected modulated light Lb. The scale on the horizontal axis indicates passage of time in the form of a phase of the emitted modulated light La. The emitted modulated light La has a pulse waveform the amplitude of which changes periodically. Since the reflected modulated light Lb is derived from the emitted modulated light La, the period of the reflected modulated light Lb becomes equal to the period of the emitted modulated light La. For example, one period is expressed by 360 degrees and the passage of time on the horizontal axis in FIG. 4 is indicated as repetition of phases in one period ranging from 0 degrees to 360 degrees.

The emitted modulated light La is light which is derived from modulated light that the modulated light emission unit 2 emits and the level of the emitted modulated light La is set "Low" in light-out time of the modulated light emission unit 2 and "High" in light-up time of the modulated light emission unit 2. It is possible to increase and decrease the light intensity corresponding to the High level in light-up time by increasing and decreasing electric currents to be supplied to the modulated light emission unit 2.

The emitted modulated light La is in the form of a rectangular wave of, for example, a period=100 ns (a frequency=10 MHz) and a duty ratio=50%. In the example in FIG. 4, a rising time of the emitted modulated light La is expressed by the phase=0 degrees. The emitted modulated light La which has been emitted from the distance measuring device 1 reaches the object for distance measurement 7 (FIG. 1), is reflected from the object for distance measurement 7 and returns to the distance measuring device 1 as the reflected modulated light Lb. Consequently, the reflected modulated light Lb has a phase delay of the amount corresponding to a time that light takes to travel over the length which is twice the distance D from the distance measuring device 1 to the object for distance measurement 7 behind the emitted modulated light La and the phase difference $\phi$ occurs between the emitted modulated light La and the reflected modulated light Lb. It is possible to measure the distance D between the distance measuring device 1 and the object for distance measurement 7 from the phase difference $\phi$.

As described before, the pixel read-out control part 17 (FIG. 2) reads the respective stored charge quantities of charges which have been retained as pieces of information relating to an incident intensity Ii of the reflected modulated light Lb which has been incident upon the corresponding pixel G in different terms by making timings of storing the charges into the floating diffusion parts Fd1 to Fd4 different from one another by controlling the on/off operations of the switches M1 to M4 via the lines Tx1 to Tx4 out of the floating diffusion parts Fd1 to Fd4 in a lump via the lines Bi and Ro for every pixel G.

In FIG. 4, T1 to T4 indicate storage terms of charges of the stored charge quantities that the pixel read-out control unit 17 reads out of the floating diffusion parts Fd1 to Fd4.

The lengths of the terms T1 to T4 are equal to the lengths of the high and low terms of the emitted modulated light La and are set to, for example, 180 degrees (a half period of the emitted modulated light La). The terms are delayed in start by, for example, every 90 degrees (¼ of the period) in the phase of the emitted modulated light La in order of T1, T2, T3 and T4. That is, the term T1 is set as a term of a phase range from 0 degrees to 180 degrees. The term T2 is set as a term of a phase range from 90 degrees to 270 degrees. The term T3 is set as a term of a phase range from 180 degrees to 360 degrees. The term T4 is set as a term of a phase range from 270 degrees to 360 degrees and a phase range from 0 degrees to 90 degrees of the next period, that is, it is set as a successive term of a phase range from 270 degrees to 450 degees. Consequently, the charges are stored into the floating diffusion parts Fd1 to Fd4 in stored charge quantities corresponding to the incident intensity Ii of the reflected modulated light Lb which has been incident upon the sub pixels P in the terms T1 to T4. The pixel read-out control part 17 reads out the quantities of the charges stored in the terms T1 to T4 in each pixel G as the read-out values C1 to C4.

The controller 5 calculates the phase difference $\phi$ by the following formula (1).

$$\text{Phase difference } \phi = \tan^{-1}\{(C1-C3)/(C2-C4)\} \quad \text{Formula (1):}$$

In the above formula, "tan" means tangent and "$\tan^{-1}$" means arctangent. Although the stored charge quantity of the charges caused by the incident light which is derived from the background light is included in each of the values C1 to C4, the influence caused by the incident light which is derived from the background light is removed from a difference C1−C3 and a difference C2−C4.

Figure 5A:
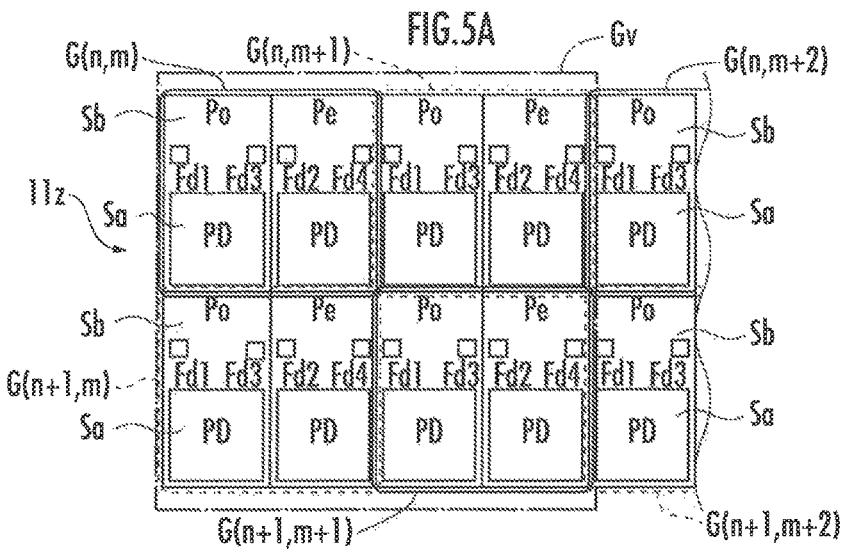
FIG. 5A is a front view illustrating a pixel array part as a reference example.
Figure 5B:
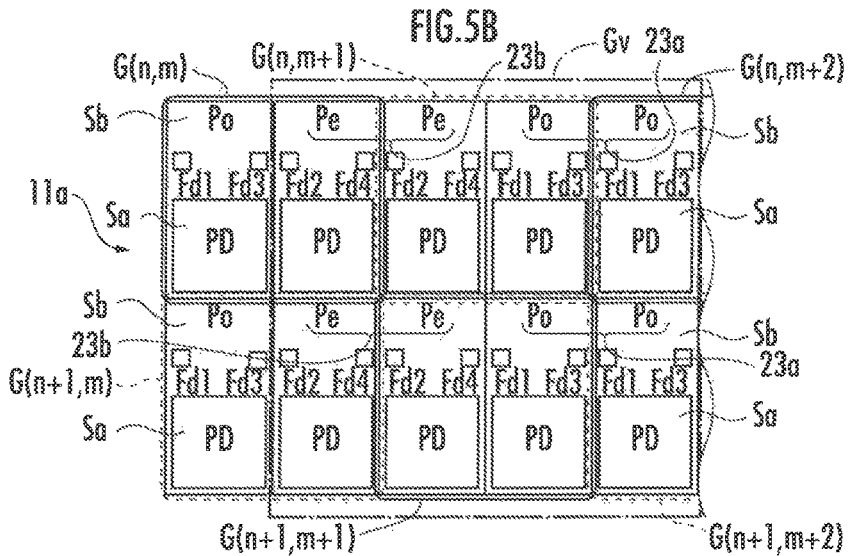
FIG. 5B is a front view illustrating a first example of a pixel array part which is illustrated in FIG. 2.
Figure 5C:
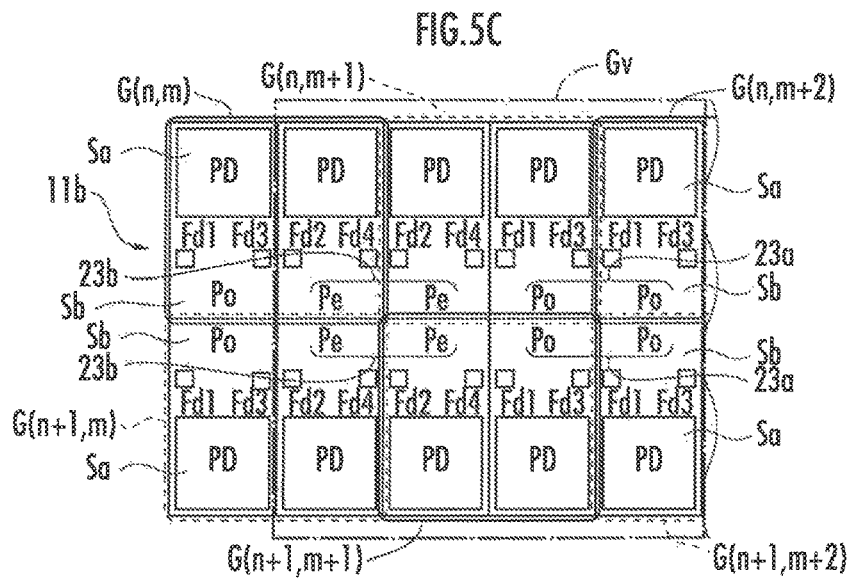
FIG. 5C is a front view illustrating a second example of the pixel array part which is illustrated in FIG. 2.

FIG. 5A to FIG. 5C are front views illustrating examples of the pixel array parts having various grid arrays. A pixel array part 11z in FIG. 5A is illustrated as a reference example for easy understanding of description of a later described reduction in length of the binning connection wire. A pixel array part 11a in FIG. 5B is a first example of the pixel array part 11 (FIG. 2). A pixel array part 11b in FIG. 5C is a second example of the pixel array part 11.

FIG. 5A to FIG. 5C each illustrates a pixel range of 2 (longitudinal)×2.5 (transverse) in the number of the pixels G which has been extracted from within the grid array. That is, in these drawings, pixels G(n, m), G(n, m+1), G(n+1, m) and G(n+1, m+1) are wholly illustrated. Only one-sided half parts of pixels G(n, m+2) and G(n+1, m+2) are illustrated.

For the convenience of description of FIG. 5A to FIG. 5C, a relative position of the grid array of the pixels G is defined. The relative position of the grid array is made to correspond to the relative position in FIG. 5A to FIG. 5C viewed from the front. In regard to the row number n of the pixel G(n, m), the larger the numerical value is, the lower row the value indicates. In regard to the column number m of the pixel G(n, m), the larger the numerical value is, the more rightward column the value indicates.

A configuration which is common among the pixel array parts in FIG. 5A to FIG. 5C will be described first and then individual configurations of the pixel array parts in FIG. 5A to FIG. 5C will be described. A ratio of the longitudinal (column direction) dimension to the transverse (row direction) dimension of each of the pixel G, the sub pixel P and the photodiode PD illustrated in FIG. 5A to FIG. 5C is illustrated so as to be almost the same as the dimension ratio of the actual product for easy understanding of the description on the later described reduction in length of the binning connection wire in each of the pixel array parts 11z, 11a and 11b.

The area of the photodiode PD relative to the area of the sub pixel P determines the aperture ratio (=the aperture ratio of the pixel G) of the sub pixel P. The larger the aperture ratio of the pixel G becomes, the more it becomes advantageous for miniaturization and improvement of performance of the pixel array part 11. Accordingly, it is preferable to reduce an occupied region of a circuit part including a wiring region and to increase the ratio that the photodiode PD occupies in the sub pixel P by reducing the length of wiring in the sub pixel P.

In the sub pixel P, a region in which the photodiode PD is arranged will be called a "first region Sa" and a region in which the floating diffusion part Fd1, the switch M1 and so forth (circuit elements) other than the photodiode PD are arranged will be called a "second region Sb". The sub pixel P has a shape which is vertically long and is partitioned into the first region Sa and the second region Sb in the longitudinal direction (the column direction).

Description will be made with reference to each of FIG. 5A to FIG. 5C. In the pixel array part 11z in FIG. 5A, all of the pixels G have the sub pixels Po and Pe respectively on the left-side parts and the right-side parts thereof. In addition, all of the sub pixels P have the second regions Sb and the first regions Sa respectively on the upper-side parts and the lower-side parts thereof.

In the pixel array part 11a in FIG. 5B, as described with reference to FIG. 2, the first row part 23a in which the two sub pixels Po are continuously arrayed in the row direction and the second row part 23b in which the two sub pixels Pe are continuously arrayed in the row direction are alternately arrayed in the row direction. Accordingly, in the pixel array part 11a, in the two regions G which are adjacent to each other in the row direction, one pixel G has the sub pixels Po and Pe respectively on the left-side part and the right-side part thereof. The other pixel G has the sub pixel Pe and Po respectively on the left-side part and the right-side part thereof. In addition, all of the sub pixels P have the second regions Sb and the first regions Sa respectively on the upper-side parts and the lower-side parts thereof as in the case of the sub pixels P of the pixel array part 11z.

The configuration of the pixel array part 11b in FIG. 5C will be described. Since the pixel array part 11b is the second example of the pixel array part 11 of the imaging element 10, the first row part 23a and the second row part 23b are alternately arrayed in the row direction. In the two pixels G which are adjacent to each other in the row direction, one pixel G has the sub pixel Po and Pe respectively on the left-side part and the right-side part thereof. The other pixel G has the sub pixel Pe and Po respectively on the left-side part and the right-side part thereof.

In the pixel array part 11b, a point which is different from the pixel array part 11a is a vertical positional relation between the first region Sa and the second region Sb. In the pixel array part 11a, all of the sub pixels P have the second regions Sb and the first regions Sa respectively on the upper-side parts and the lower-side parts thereof. On the other hand, in the pixel array part 11b, a row that only the sub pixels P which have the first regions Sa and the second regions Sb respectively on the upper-side parts and the lower-side parts thereof occupy and a row that only the sub pixels P which have the second regions Sb and the first regions Sa respectively on the upper-side parts and the lower-side parts thereof occupy are alternately arrayed in the column direction.

Here, a binning group (a sub pixel group) Gv which is adapted to cope with the binning read-out mode will be described. The binning group Gv is set as an assembly of the eight sub pixels P in total which are continuously arrayed longitudinally and transversely in a matrix of 2 (longitudinal)×4 (transverse). The binning group Gv is set as an array range that two array parts in each of which the first row part 23a and the second row part 23b are adjacent to each other in the row direction are arrayed continuously in the column direction.

In the pixel array part 11z (FIG. 5A), the binning group Gv is set such that the sub pixels are arrayed in order of Po, Pe, Po, and Pe from the left side in each row. In each of the pixel array part 11a (FIG. 5B) and the pixel array part 11b (FIG. 5C), the binning group Gv is set such that the sub pixels are arrayed in order of Pe, Pe, Po and Po from the left side in each row. Incidentally, in a case where the binning group Gv has been set in this way, in the grid array (see FIG. 2) of the entire of the pixel array part 11, the sub pixel Po in the left-most end column (the first column) and the sub pixel Pe in the right-most end column (the final column) are not used as the sub pixels P of the binning group Gv.

Figure 7:
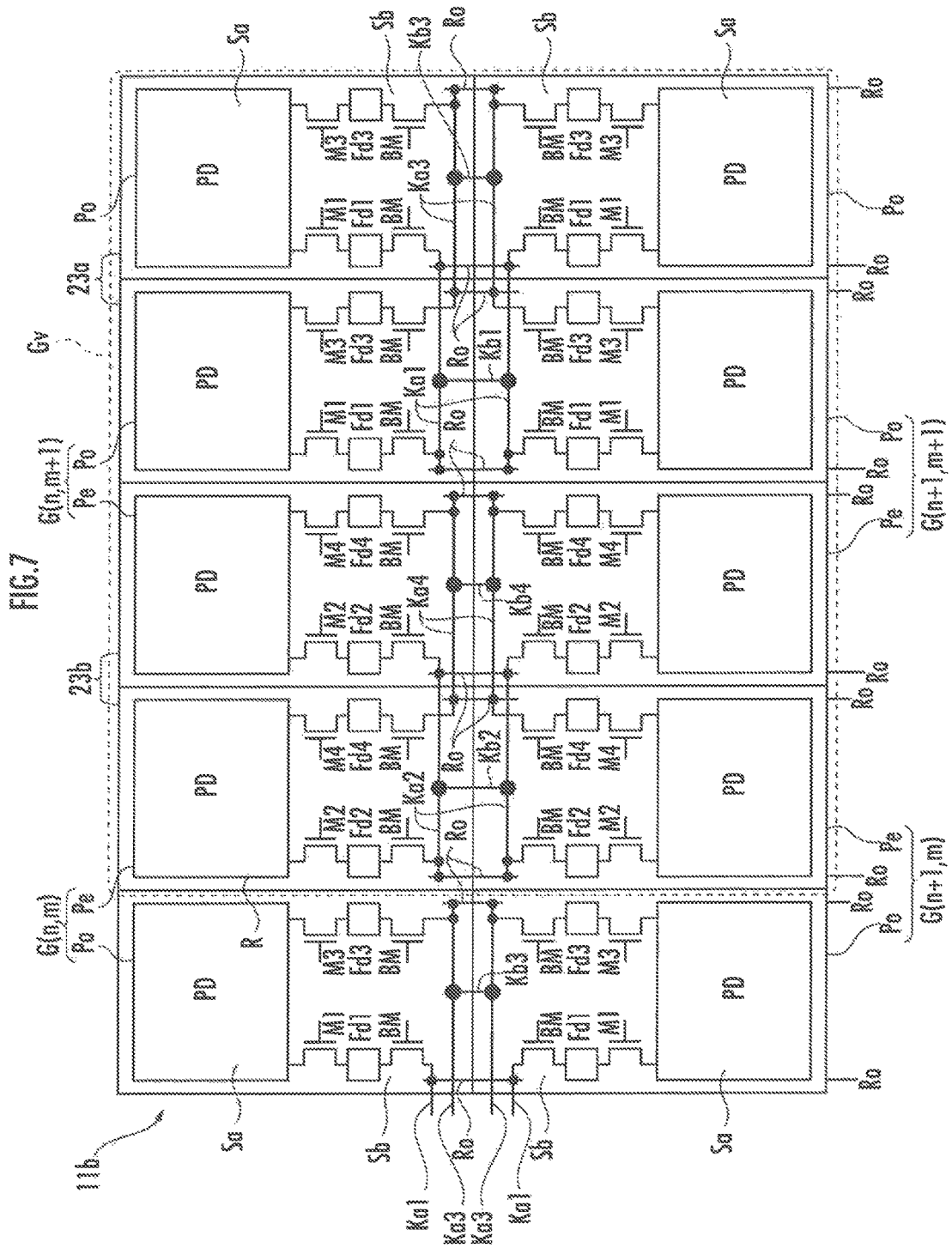
FIG. 7 is a diagram illustrating one example of a connection wire for binning in the pixel array part in FIG. 5C.

FIG. 6 and FIG. 7 illustrate examples of binning connection wires respectively in the pixel array part 11a in FIG. 5B and the pixel array part 11b in FIG. 5C. Specifically, the binning connection wires of the pixel array parts 11a and 11b are connection wires Ka1 to Ka4 and Kb1 to Kb4. All of these connection wires are connection wires in each binning group Gv and are not the connection wires between the binning groups Gv. In each binning group Gv, the connection wires Ka1 to Ka4 are wiring lines in the row direction and the connection wires Kb1 to Kb4 are wiring lines in the column direction.

Although illustration is omitted, such switches BM as illustrated in FIG. 3 are individually inserted into the respective connection wires Ka1 to Ka4, and Kb1 to Kb4 so as to allow switching of objects for wire connection on the both ends between the connected state and the unconnected state by the on-off operation of the switches BM. In the plurality of binning groups Gv which belong to the same row, switching of the connection wires Ka1 to Ka4, and Kb1 to Kb4 between the connected state and the unconnected state is performed all at once when the mutual binning groups Gv which belong to the same row are in the binning read-out mode on the basis of the control signal on the additional line Bi (not illustrated) for binning. Incidentally, since the binning groups Gv occupy two rows in the grid arrays of the pixels G of the pixel array parts 11a and 11b, that the plurality of binning groups Gv belong to the same row means that the binning groups Gv occupy the same two rows which are arranged continuously in the grid array.

In each binning group Gv, the object for wire connection of each of the connection wires Ka1 to Ka4 and Kb1 to Kb4 will be specifically described. Each connection wire Ka1 connects between the drains of the switches BM of the two floating diffusion parts Fd1 in the same row. Each connection wire Ka2 connects between the drains of the switches BM of the two floating diffusion parts Fd2 in the same row. Each connection wire Ka3 connects between the drains of the switches BM of the two floating diffusion parts Fd3 in the same row. Each connection wire Ka4 connects between the drains of the switches BM of the two floating diffusion parts Fd4 in the same row.

The connection wires Ka1 to Ka4 connect between the drains of the individually corresponding switches BM respectively and thereby connect together the mutual floating diffusion parts Fd1 which correspond to the connection wire Ka1, the mutual floating diffusion parts Fd2 which correspond to the connection wire Ka2, the mutual floating diffusion parts Fd3 which correspond to the connection wire Ka3, and the mutual floating diffusion parts Fd4 which correspond to the connection wire Ka4 respectively via the individually corresponding switches BM which are in the on state when data reading in the binning read-out mode. In addition, the connection wires Kb1 to Kb4 connect together the mutual connection wires Ka1 to Ka4 which correspond to the connection wires individually and thereby connect together the mutual floating diffusion parts Fd1 which correspond to the connection wire Kb1, the mutual floating diffusion parts Fd2 which correspond to the connection wire Kb2, the mutual floating diffusion parts Fd3 which correspond to the connection wire Kb3 and the mutual floating diffusion parts Fd4 which correspond to the connection wire Kb4 respectively via the connection wires Ka1 to Ka4 when data reading in the binning read-out mode.

The connection wire Kb1 connects together the two connection wires Ka1. The connection wire Kb2 connects together the two connection wires Ka2. The connection wire Kb3 connects together the two connection wires Ka3. The connection wire Kb4 connects together the two connection wires Ka4.

In the pixel array part 11a illustrated in FIG. 6, although the connection wires Kb1 to Kb4 are illustrated in a state of extending across the photodiodes PD in the binning group Gv, the connection wires Kb1 to Kb4 are so illustrated for simplification of illustration. In the pixel array part 11a as that in the actual product, the connection wires Kb1 to Kb4 pass along margins which are present outside the side faces of the photodiodes PD in the sub pixel P by going around the photodiodes PD. Thereby, the light incident upon the photodiodes PD is prevented from being obstructed by the connection wires Kb1 to Kb4.

As apparent from comparison among FIG. 5A to FIG. 5C, the connection wires Ka1 to Ka4 in the pixel array part 11z are not in a relation that the two sub pixels P that the objects for wire connection are present are adjacent to each other in the row direction but in a relation that the two sub pixels are indirectly adjacent to each other with another sub pixel being interposed. On the other hand, the connection wires Ka1 to Ka4 in the pixel array parts 11a and 11b are in a relation that the two sub pixels P that the objects for wire connection are present are adjacent to each other in the row direction. Consequently, in the pixel array parts 11a and 11b, the lengths of the connection wires Ka1 to Ka4 are made shorter than those of the connection wires in the pixel array part 11z by the amount corresponding to the size in the row direction of one sub pixel P.

Further, in the pixel array part 11b, in each binning group Gv, the sub pixel P in the upper row and the sub pixel P in the lower row are arrayed with their mutual second regions Sb being adjacent to each other in the column direction. Consequently, in the pixel array part 11b, the both ends of the connection wires Kb1 to Kb4 are not located on the both sides of the photodiodes PD in the column direction unlike the pixel array part 11a. Thereby, the lengths of the connection wires Kb1 to Kb4 of the pixel array part 11b are made shorter than the lengths of the connection wires Kb1 to Kb4 of the pixel array part 11a by the amount corresponding to the size in the column direction of one photodiode PD.

Action of the imaging element 10 onto which the pixel array part 11a or 11b is to be mounted will be described.

The distance measuring device 1 has a standard distance measurement mode and a binning distance measurement mode. In the standard distance measurement mode, the distance D from the distance measuring device 1 to a part of the object for distance measurement 7 which corresponds to the pixel G is measured for every pixel G of the imaging element 10. In the binning distance measurement mode, the distance D from the distance measuring device 1 to the part of the object for distance measurement 7 which corresponds to the binning group Gv is measured for every binning group Gv of the imaging element 10. Although the dissolution in the binning distance measurement mode is lower than the dissolution in the standard distance measurement mode, the required time taken for performing the distance measurement processing is reduced and the influence of the noise is reduced.

The controller 5 has a standard read-out mode and a binning read-out mode in regard to data reading out of the imaging element 10 in correspondence with the standard distance measurement mode and the binning distance measurement mode. The controller 5 reads the stored charge quantities out of the floating diffusion parts Fd1 to Fd4 for every pixel G in the standard read-out mode. The controller 5 reads the stored charge quantities out of the floating diffusion parts Fd1 to Fd4 for every binning group Gv in the binning read-out mode. Although each binning group Gv includes four each for the floating diffusion parts Fd1 to Fd4, when reading the stored charge quantities out of the floating diffusion parts Fd1 to Fd4 for every binning group Gv, the stored charge quantities are not read out of the floating diffusion parts Fd1 to Fd4 of each binning group Gv individually for four pixels G at a time, the stored charge quantifies are simultaneously read out as an average value or a total value of all of the four pixels G.

The overall action of the distance measuring device 1 will be described.

First, the action of the distance measuring device 1 in the standard distance measurement mode will be described. In the standard distance measurement mode, the controller 5 reads data out of the camera 4 in the standard read-out mode.

The row control part 15 supplies control signals respectively to the lines Bi. Thereby, the switches BM (FIG. 3) of the pixels G in the same row are turned on all at once. Then, the column control part 16 selects one line Ro and brings it into the conductive state. Thereby, in the switches BM whose drains are connected to the line Ro which is in the conductive state, the stored charge quantity of the floating diffusion part Fd which is connected to the switch BM which is in the on state is read out by the pixel read-out control part 17 via the column control part 16. The controller 5 reads out the values C1 to C4 for every pixel G in this way.

In the controller 5, the phase difference detection part 51 detects the phase difference φ between the emitted modulated light La and the reflected modulated light Lb for every pixel G by using Formula (1) on the basis of the values C1 to C4 which have been read out of the camera 4 individually for every pixel G. The distance measuring unit 52 measures the distance D from the distance measuring device 1 to each part of the object for distance measurement 7 which corresponds to each pixel G on the basis of the phase difference φ.

A calculation formula for the distance D is, for example, the following Formula (2). Since the phase difference detection unit 51 detects the phase difference φ (n, m) for every pixel G(n, m), the distance measuring unit 52 calculates the distance D for every pixel G(n, m).

Distance $D=$(a light speed$\times 100$ ns$\times$the phase difference $\phi(n, m)$)/(360 degrees$\times 2$), where the unit of the phase difference φ is "deg". Formula (2):

Next, the action of the distance measuring device 1 in the binning distance measurement mode will be described. In the binning distance measurement mode, the controller 5 reads data out of the camera 4 in the binning read-out mode. In the binning read-out mode, the row control part 15 simultaneously supplies the control signals to the lines Bi of the plurality of binning groups Gv in the same row. Incidentally, since the binning groups Gv occupy the two continuously arrayed rows in the grid array of the pixels G in the pixel array parts 11a and 11b, the lines Bi to which the control signals are sent are two lines which are continuously provided in the grid array.

Thereby, the switches BM (FIG. 3) which are arrayed in the two continuously arrayed rows are turned on all at once. In addition, the row control part 15 turns the connection wires Ka1 to Ka4 and Kb1 to Kb4 of the binning groups Gv in the two continuously arrayed rows on all at once via the control signal supplied to the additional line Bi (not illustrated) for binning. Consequently, the stored charge quantities of the floating diffusion parts Fd1 to Fd4 which have been mutually connected by the connection wires Ka1 to Ka4 and Kb1 to Kb4 and are arranged four by four are averaged.

Next, the column control part 16 selects one of two lines Ro which are arranged in correspondence with the value C1 from the eight lines Ro which belong to each binning group Gv. Then, the column control part 16 brings the selected one line Ro into the conductive state and reads out the value C1 (FIG. 3). The value C1 corresponds to the average value or the total value of the stored charge quantities of the four floating diffusion parts Fd1 in the binning group Gv. Read-out processing performed on the value C1 is also performed on the values C2 to C4 in order. The controller 5 reads out the values C1 to C4 for every binning group Gv in this way.

In the controller 5, the phase difference detection unit 51 detects the phase difference φ between the emitted modulated light La and the reflected modulated light Lb for every binning group Gv using Formula (1) on the basis of the values C1 to C4 which have been read out of the camera 4 individually for every binning group Gv.

The distance measuring unit 52 measures the distance D from the distance measuring device 1 to each part of the corresponding object for distance measurement 7 for every binning group Gv on the basis of the phase difference φ. In calculation of the distance D performed in this case, the aforementioned Formula (2) is used. However, n and m in the phase difference φ (n, m) in Formula (2) are changed to the row number and the column number which have been allocated to each binning group Gv for specification of the position of each binning group Gv in the grid array of the pixel array part 11.

Although the dissolution in the binning distance measurement mode is lower than the dissolution in the standard distance measurement mode, the required time taken for performing the distance measurement processing is reduced and the influence of the noise is reduced.

Although the embodiments of the present invention have been described, the present invention is not limited to the above-mentioned embodiments and includes various altered examples within a range included in the same technical idea.

The first charge generation part and the second charge generation part of the present invention correspond to, for example, the photodiode PD of the sub pixel Po and the photodiode PD of the sub pixel Pe respectively.

Although the first sub pixel and the second sub pixel of the present invention correspond to, for example, the sub pixels Po and Pe respectively, it is also possible to make the first sub pixel and the second sub pixel reversely correspond to the sub pixels Po and Pe respectively.

The first charge storage part, the second charge storage part, the third charge storage part and the fourth charge storage part of the present invention correspond to, for example, the floating diffusion parts Fd1, Fd2, Fd3 and Fd4 respectively.

The first connection wire, the second connection wire, the third connection wire and the fourth connection wire of the present invention correspond to, for example, the connection wires Ka1, Ka2, Ka3 and Ka4 respectively.

The fifth connection wire, the sixth connection wire, the seventh connection wire and the eighth connection wire of the present invention correspond to, for example, the connection wires Kb1, Kb2, Kb3 and Kb4 respectively.

The binning group Gv of the embodiments corresponds to the sub pixel group of the present invention. The sub pixels in the row direction of the binning group Gv are arrayed in order of the sub pixels Pe, Pe, Po and Po. In the sub pixel group of the present invention, the sub pixels in the row direction may be also arrayed in order of the sub pixels Po, Po, Pe and Pe.

The first term, the second term, the third term and the fourth term of the present invention correspond to the terms T1 to T4 of the embodiments respectively. The lengths of the terms T1 to T4 are set to equal half-period lengths which are less than one period of the emitted modulated light La. However, the first term, the second term, the third term and the fourth term of the present invention may have lengths of ¼ of one period of the emitted modulated light La.

In the embodiments, as the binning method, the information in each floating diffusion part Fd is output as a voltage via the switches BM which are connected as source followers and the mutual drains of the switches BM are connected together. The present invention is not limited to the above-mentioned binning method and other binning methods such as, for example, a method of connecting together the plurality of floating diffusion parts Fd and summing up the stored charge quantities of the floating diffusion parts Fd and so forth may be used.

What is claimed is:

1. A distance measuring device comprising:
    an imaging element which includes a plurality of pixels of
        a grid array and makes a stored charge quantity of charges which have been generated in relation to an intensity of incident light readable from the outside in units of pixels;

a modulated light emission unit which emits modulated light the intensity of which has been modulated toward an imaging range of the imaging element;

a phase difference detection unit which detects a phase difference between emitted modulated light that the modulated light emission unit has emitted and reflected modulated light which has been obtained as a result of incidence of the emitted modulated light which has been reflected from an object for distance measurement within the imaging range upon the pixels of the imaging element on the basis of the stored charge quantity which has been read out of the imaging element in units of the pixels; and a distance measuring unit which measures a distance from the distance measuring device to the object for distance measurement on the basis of the phase difference that the phase difference detection unit has detected, wherein each pixel includes a first sub pixel and a second sub pixel which have been arrayed adjacently to each other in a row direction, a first term, a second term, a third term and a fourth term which have equal lengths which are less than one period of the emitted modulated light and are delayed in start by every ¼ of the period of the emitted modulated light in order are set, the first sub pixel includes a first charge generation part which generates the charges of the charge quantity which is related to the intensity of incident light, a first charge storage part which stores the charges that the first charge generation part has generated in the first term, and a third charge storage part which stores the charges that the first charge generation part has generated in the third term, the second sub pixel includes a second charge generation part which generates the charges of the charge quantity which is related to the intensity of incident light, a second charge storage part which stores the charges that the second charge generation part has generated in the second term, and a fourth charge storage part which stores the charges that the second charge generation part has generated in the fourth term, the phase difference detection unit reads the stored charge quantity of the first charge storage part, the stored charge quantity of the second charge storage part, the stored charge quantity of the third charge storage part and the stored charge quantity of the fourth charge storage part as the stored charge quantities out of the imaging element and detects the phase difference on the basis of the read-out stored charge quantities, a first row part that the two first sub pixels are continuously arrayed in the row direction and a second row part that the two second sub pixels are continuously arrayed in the row direction are alternately arrayed in the row direction in each row of the grid array, in the adjacent first sub pixels in each first row part, the mutual first charge storage parts are connected together by a first connection wire which allows switching between a connected state and an unconnected state, and the mutual third charge storage parts are connected together by a third connection wire which allows switching between the connected state and the unconnected state, and in the adjacent second sub pixels in the second row part, the mutual second charge storage parts are connected together by a second connection wire which allows switching between the connected state and the unconnected state, and the mutual fourth charge storage parts are connected together by a fourth connection wire which allows switching between the connected state and the unconnected state.

2. The distance measuring device according to claim 1, wherein the grid array includes a column of only the first sub pixels and a column of only the second sub pixels, an assembly of the sub pixels in which two groups in each of which one first row part and one second row part are adjacent to each other in the row direction are continuously arranged in a column direction is set as one sub pixel group, and in each sub pixel group, the mutual first connection wires are connected together by a fifth connection wire which allows switching between the connected state and the unconnected state, the mutual second connection wires are connected together by a sixth connection wire which allows switching between the connected state and the unconnected state, the mutual third connection wires are connected together by a seventh connection wire which allows switching between the connected state and the unconnected state, and the mutual fourth connection wires are connected together by an eighth connection wire which allows switching between the connected state and the unconnected state.

3. The distance measuring device according to claim 2, wherein each sub pixel is partitioned into a first region in which the first charge generation part or the second charge generation part is arranged and a second region in which either the first charge storage part and the third charge storage part or the second charge storage part and the fourth charge storage part are arranged in the column direction, and in each sub pixel group, the mutually corresponding sub pixels which are adjacent to each other in the column direction are arranged with the mutual second regions thereof being adjacent to each other in the column direction.

* * * * *